Patented Aug. 7, 1934

1,968,964

UNITED STATES PATENT OFFICE 1,968,964

NORMAL FERROUS SALT OF 2-NITRONAPHTHALENE-4.8-DISULPHONIC ACID

August Sigwart, Leverkusen-on-the-Rhine, Germany, assignor to General Aniline Works, Inc., New York, N. Y., a corporation of Delaware No Drawing. Application April 4, 1932, Serial No. 603,206

1 Claim. (Cl. 260—11)

My invention relates to normal ferrous salt of 2-nitro-naphthalene-4.8-disulphonic acid suitable for separating the said acid from certain isomers generally formed in the process of sulphonating and nitrating naphthalene under certain conditions.

As a well known process 2-nitronaphthalene-4.8-disulphonic acid is prepared by sulphonating naphthalene with oleum at low temperatures to mainly 1.5-disulphonic acid and then nitrating the whole sulphonation mixture to the mono-nitro derivative. Besides the 2.4.8-compound there are formed in this process isomeric acids consisting of the 1.4.8-, the 1.3.8- and the 2.4.7-compounds.

In U. S. Letters Patent No. 1,756,537 there is described a method of isolating the 2.4.8-nitronaphthalene-disulphonic acid from its isomers by precipitating this acid as magnesium salt. According to the process described in U. S. Letters Patent No. 1,836,204 the isolation of this acid is performed by the use of compounds of metals of the zinc group consisting of the elements Ni, Co, Mn and Zn.

Now I have found that the said precipitation and separation from isomers can be effected by the use of iron salts in the ferrous-form. In this case the 2.4.8-isomer will be precipitated in the form of its Fe-salt, leaving the other isomers in solution.

Therefore, an object of this invention is to separate 2-nitronaphthalene-4.8-disulphonic acid from its isomers by means of ferrous salts, e. g. ferrous chloride or ferrous sulfate, it being self understood, that for the purpose of the invention there come into consideration only such ferrous-salts as are soluble in water, or such ferrous-compounds as form water soluble ferrous-salts in the diluted nitration mass, for example, ferrous oxide and ferrous carbonate.

The amount of the ferrous-salts necessary for precipitating all the 2.4.8-isomer can be readily estimated from previous experience about the proportion of the said acid in the nitration mass. The best method to avoid a deficiency of the ferrous-salt is to add the ferrous-compound in small quantities, until a sample of the mother liquor separately tested with a small quantity of the precipitant shows no further precipitation. An excess of Fe-ion will not affect the separation.

My usual method is to dilute the acid nitration mass with water to a concentration of about 20% sulphuric acid content and, after cooling down to 50° C. adding the precipitating salt in form of ferrous-sulphate. It is possible, however, to dissolve the ferrous sulphate first in water and then to add its aqueous solution to the diluted nitration mixture.

To further illustrate my invention, the following specific example is submitted, but it should be understood that the invention is not limited to said conditions.

*Example.*—The finished nitration mass obtained by sulphonating 450 parts of naphthalene with 900 parts of monohydrate and 1000 parts of 65% oleum at 20–40° C., diluting with 190 parts of water, then nitrating with 380 parts of nitric acid of 67½%, is poured into 4000 parts of water. After stirring for some time to bring the nitrous gases out, 240 parts of crystallized ferrous-sulphate are added at 40° C., and then the mass is cooled down to 15–20° C. The normal ferrous-salt of 2-nitro-4.8-naphthalenedisulphonic acid which separates in form of small yellowish crystals is filtered off from the other isomers present in the mother liquor.

I am aware that numerous details of my invention may be varied by a wide range of modifications without departing from the spirit of this invention and I do not desire limiting the patent on the only conditions referred in the example.

I claim:

The normal ferrous-salt of naphthalene 2-nitro-4.8-disulphonic acid, being a yellowish crystalline substance.

AUGUST SIGWART.